(12) United States Patent
Hanazono et al.

(10) Patent No.: US 10,378,674 B2
(45) Date of Patent: Aug. 13, 2019

(54) HOT AND COLD WATER MIXING VALVE DEVICE

(71) Applicant: TOTO LTD., Kitakyushu-shi, Fukuoka (JP)

(72) Inventors: Masaki Hanazono, Kitakyushu (JP); Takafumi Miyagi, Kitakyushu (JP); Emiko Sumimoto, Kitakyushu (JP); Yoshihiro Kiyofuji, Kitakyushu (JP)

(73) Assignee: TOTO LTD., Kitakyushu-Shi, Fukuoka (JP)

( * ) Notice: Subject to any disclaimer, the term of this patent is extended or adjusted under 35 U.S.C. 154(b) by 246 days.

(21) Appl. No.: 15/454,957

(22) Filed: Mar. 9, 2017

(65) Prior Publication Data

US 2017/0277208 A1  Sep. 28, 2017

(30) Foreign Application Priority Data

Mar. 23, 2016  (JP) ................................. 2016-058284

(51) Int. Cl.
| | | |
|---|---|---|
| *F16K 31/60* | (2006.01) | |
| *E03C 1/04* | (2006.01) | |
| *G05D 23/13* | (2006.01) | |
| *F16K 11/20* | (2006.01) | |

(52) U.S. Cl.
CPC .............. *F16K 31/602* (2013.01); *E03C 1/04* (2013.01); *G05D 23/1353* (2013.01); *F16K 11/205* (2013.01); *Y10T 137/86815* (2015.04); *Y10T 137/87684* (2015.04)

(58) Field of Classification Search
CPC . F16K 31/602; F16K 11/205; G05D 23/1353; E03C 1/04; Y10T 137/87684; Y10T 137/86815
See application file for complete search history.

(56) References Cited

U.S. PATENT DOCUMENTS

| | | | | |
|---|---|---|---|---|
| 2,465,458 A | * | 3/1949 | Jordan ................. | G05D 23/132 137/625.4 |
| 2,828,075 A | * | 3/1958 | Panza ................ | G05D 23/1346 137/625.4 |
| 3,028,094 A | * | 4/1962 | Burhop .............. | G05D 23/1353 137/637.4 |

(Continued)

FOREIGN PATENT DOCUMENTS

| | | | | |
|---|---|---|---|---|
| CH | 376332 A | * | 3/1964 | ......... G05D 23/1353 |
| CH | 377288 A | * | 4/1964 | ......... G05D 23/1353 |

(Continued)

*Primary Examiner* — Matthew W Jellett
*Assistant Examiner* — Christopher D Ballman
(74) *Attorney, Agent, or Firm* — Baker & Hostetler LLP

(57) ABSTRACT

The hot and cold water mixing valve device includes a hot and cold water mixing valve unit; a flow control valve unit; a valve device main body; a hot and cold water mixing valve housing; and a flow control valve housing; and wherein the valve device main body includes: a hot water passageway permitting communication between only the hot water inlet of the valve device main body and the hot water inlet of the hot and cold water mixing valve unit; and a cold water passageway permitting communication between only the cold water inlet of the valve device main body and the cold water inlet of the hot and cold water mixing valve unit are formed on the interior of the valve device main body.

9 Claims, 8 Drawing Sheets

(56) References Cited

U.S. PATENT DOCUMENTS

| | | | | |
|---|---|---|---|---|
| 3,539,099 | A * | 11/1970 | Grohe | G05D 23/1353 137/99 |
| 3,901,261 | A * | 8/1975 | Riis | F16K 11/205 137/100 |
| 4,381,073 | A * | 4/1983 | Gloor | G05D 23/1353 137/606 |
| 4,816,083 | A * | 3/1989 | Bangyan | F24D 19/1015 137/271 |
| 5,579,992 | A * | 12/1996 | Masatoshi | F16K 31/002 236/101 D |
| 5,924,449 | A * | 7/1999 | Enoki | E03C 1/04 137/454.5 |
| 6,446,655 | B1 * | 9/2002 | Chang | G05D 23/1353 137/100 |
| 7,445,024 | B2 * | 11/2008 | Paterson | E03C 1/057 137/549 |
| 8,353,462 | B2 * | 1/2013 | Todaka | F16K 11/07 236/101 A |
| 2004/0016816 | A1 * | 1/2004 | Ginter | G05D 23/1353 236/12.15 |
| 2009/0095361 | A1 * | 4/2009 | Chung | E03C 1/04 137/594 |

FOREIGN PATENT DOCUMENTS

| | | | | |
|---|---|---|---|---|
| DE | 1206241 B | * | 12/1965 | ......... G05D 23/1353 |
| DE | 4420331 A1 | * | 12/1995 | ............ E03C 1/057 |
| EP | 2386927 A2 | * | 11/2011 | ......... G05D 23/1353 |
| JP | H06-313490 A | | 11/1994 | |
| WO | WO-2005043018 A1 | * | 5/2005 | ......... G05D 23/1353 |

* cited by examiner

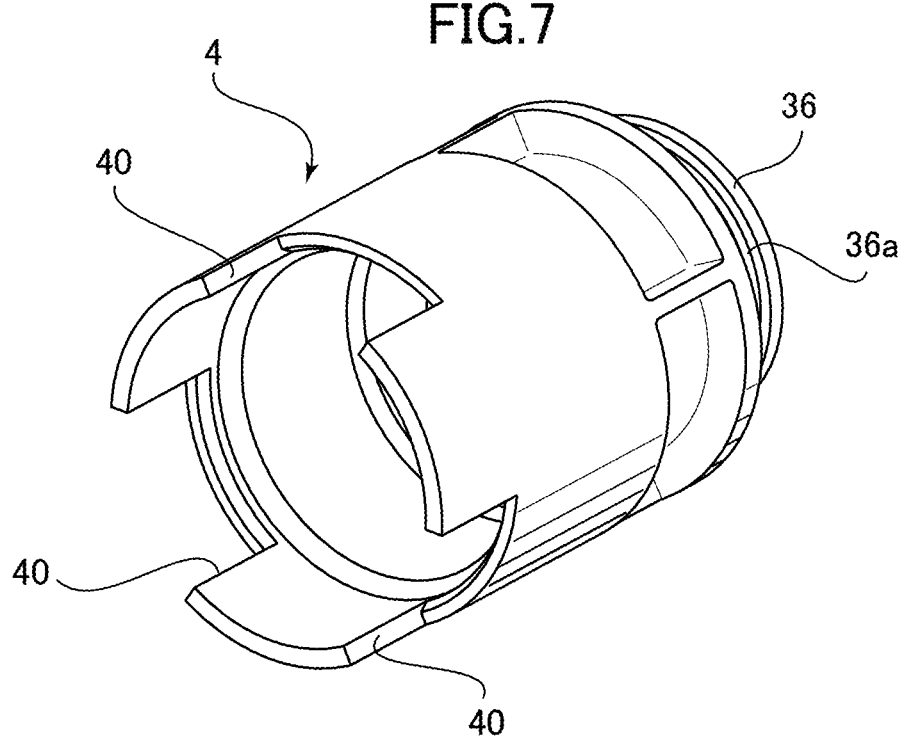
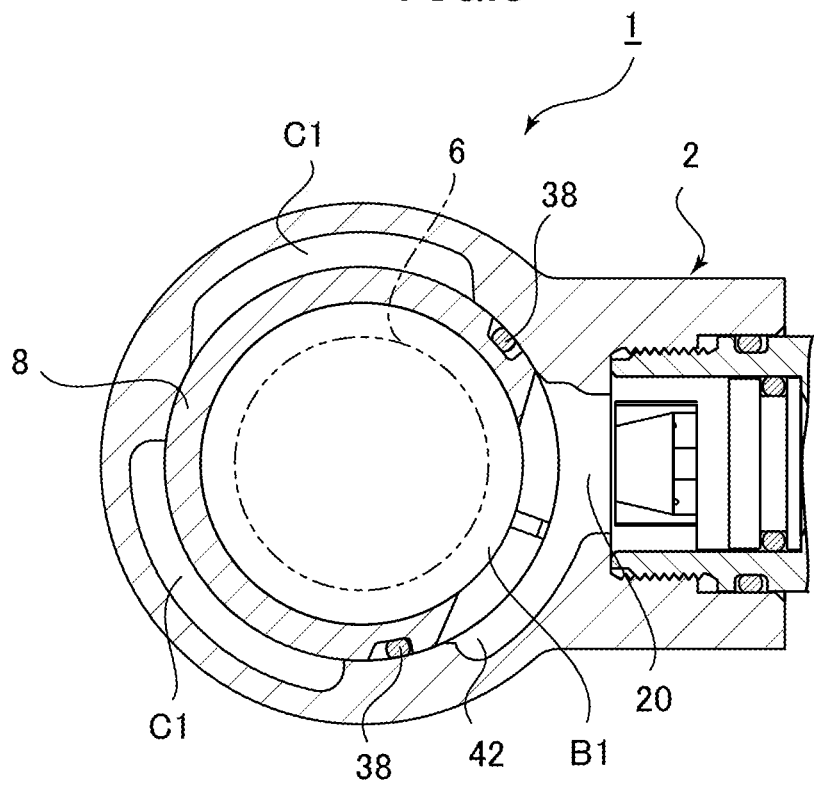

HOT AND COLD WATER MIXING VALVE DEVICE

TECHNICAL FIELD

The present invention relates to a hot and cold water mixing valve device, and more particularly to a hot and cold water mixing valve device for spouting and shutting off a mixture of hot and cold water in which hot water supplied from a hot water source and cold water supplied from a cold water source are mixed.

BACKGROUND

For some time, known hot and cold water mixing valve devices for spouting and shutting off a mixture of hot and cold water in which hot water supplied from a hot water source and cold water supplied from a cold water source are mixed have included, for example, those in which an external casing creating the external appearance of a mixing valve device is a cast-molded product.

In the conventional hot and cold water mixing valve set forth in this Patent Document 1 (Japanese Patent Unexamined Publication No. 6-313490 (Heisei)), a cylindrical mixing valve device main body is housed within a cylindrical external casing, being a cast part, and this mixing valve device main body includes a cylindrical external casing tightly adhering to the outside casing, and a cylindrical inside casing installed in a watertight manner inside this outside casing.

A mixing valve cartridge for mixing hot and cold water, and a switching valve cartridge for switching between spouting and shutting off water from the tap and controlling the amount of spouted water, are respectively housed in a watertight manner and affixed inside the inner cartridge.

I.e., in the above-described conventional hot and cold water mixing valve device, a plurality of O-rings are respectively installed between the exterior casing and the outside casing of the mixing valve device main body on the inside thereof, between the outside casing of the mixing valve device main body and the inside casing on the inside thereof, and between the inside casing of the mixing valve device main body and the mixing valve cartridge and switching valve cartridge on the inside thereof. During assembly, the mixing valve device main body is inserted from one of the openings at the two end portions in the longitudinal direction of the cylindrical outside casing, being a cast-formed part, and after sliding to a predetermined housing position inside the outside casing in a tightly adhered state mediated by the inner surface of the outside casing and the O-ring, the mixing valve device main body is affixed in a watertight manner inside the outside casing.

In addition, because internal passages for hot and cold water are formed by housing and holding of the mixing valve device main body inside the external casing, no special mechanical machining is required to provide an internal passage, thereby simplifying the hot and cold water mixing valve device manufacturing process, even though the external casing is a cast-molded part.

However, for the above-described conventional hot and cold water mixing valve device, required specifications in some cases differ due to various differences in installation conditions between Japan and overseas regions.

For example, depending on installation conditions, in some cases a longer than normal specification for the exterior dimension in the longitudinal direction of the hot and cold water mixing valve device is used, or a longer specification is used for the axial center distance between the hot water inlet and the cold water inlet of the hot and cold water mixing valve device (the distance between the central axis of the hot water inlet and the central axis of the cold water inlet in the hot and cold water mixing valve device); in these cases, the distance over which the hot and cold water mixing faucet is slid up to a predetermined housing position in the external casing after being inserted from the opening at one end in the longitudinal direction of the external casing is lengthened when assembling the hot and cold water mixing valve device.

Hence the longer the inter-axis distance between the hot water inlet and the cold water inlet on the hot and cold water mixing valve device or the outside diameter dimension of the valve device main body in the longitudinal direction, the greater the potential that the O ring between the inside surface of the external casing and the valve device main body will slip off the specified watertight position due to rubbing resistance during assembly, damaging the watertightness of the valve device main body interior; as an additional problem, the condition of the interior such valve device main bodies cannot be visually inspected from the outside.

SUMMARY

The present invention was thus undertaken to resolve the above-described problems with the conventional art, and has the object of providing a hot and cold water mixing valve device capable of improving ease of assembly and productivity while assuring watertightness.

In order to solve the above-described problems, the present invention is a hot and cold water mixing valve device for spouting and turning off a hot and cold water mixture, the mixing valve device comprising: a hot and cold water mixing valve unit being formed cylindrically, the hot and cold water mixing valve unit being configured to produce the hot and cold water mixture; a flow control valve unit being formed cylindrically, the flow control valve unit being configured to control a flow volume of the hot and cold water mixture; a valve device main body being formed cylindrically, the valve device main body including: a hot water inlet into which hot water supplied from a hot water supply source flows; a cold water inlet into which cold water supplied from the cold water supply source flows; an outlet from which the hot and cold water mixture is discharged; and a cylindrical portion being inside of the valve device main body and being configured to extend in a longitudinal direction of the valve device main body; a hot and cold water mixing valve housing having a watertight connection with one end of the cylindrical portion when the hot and cold water mixing valve housing is inserted from one end of the valve device main body; and a flow control valve housing being capable of watertight connection to other end of the cylindrical portion when the flow control valve housing is inserted from other end of the valve device main body; wherein one end of the hot and cold water mixing valve unit is configured to be connected in a watertight manner to an inside of the hot and cold water mixing valve housing; the flow control valve unit is configured to be connected in a watertight manner to the inside of the flow control valve housing; and wherein when the hot and cold water mixing valve housing and the hot and cold water mixing valve unit are inserted from one end of the valve device main body while the flow control valve housing and flow control valve unit are inserted into the other end of the valve device main body, the inside of the mixing valve main body includes: a hot water passageway allowing communication between only the hot water inlet of the valve device main body and a hot water inlet of the hot and cold water mixing valve unit; and a cold water passageway allowing communication between only the cold water inlet of the valve device main body and a cold water inlet of the hot and cold water mixing valve unit; the cold water passageway is formed between the valve device main body and the flow control valve housing, between the valve device main body and the cylindrical portion, and between the valve device main body and the hot and cold water mixing valve housing; a downstream side of the hot and cold water mixing valve unit is configured to communicate with only the flow control valve unit via the hot and cold water mixing valve housing; and a downstream side of the flow control valve unit is configured to communicate with only the outlet on the valve device main body.

According to the invention thus constituted, with the hot and cold water mixing valve housing and hot and cold water mixing valve unit inserted from one end of the valve device main body and the flow control valve housing and flow control valve unit inserted from the other end of the valve device main body, a passageway allowing communication between only the hot water inlet of the valve device main body and the hot water inlet of the hot and cold water mixing valve unit is formed on the interior of the valve device main body, and a passageway allowing communication between only the cold water inlet of the valve device main body and the cold water inlet of the hot and cold water mixing valve unit, are formed on the interior of the valve device main body. This water passageway is formed between the valve device main body and the flow control valve housing, between the valve device main body and the cylindrical portion of the valve device main body, and between the valve device main body and the hot and cold water mixing valve housing. Thus the hot and cold water mixing valve device can be achieved in which, because water in this passageway is made to flow on the outermost circumference of the inside of the valve device main body, the hot and cold water mixing valve device is not hot even if a user contacts its surface.

There is also a hot and cold water mixing valve housing capable of connecting in a watertight manner to one end of the cylindrical portion by insertion from one end of the valve device main body, and a flow control valve housing capable of connecting in a watertight manner to the other end of the cylindrical portion by insertion from the other end of the valve device main body. In addition, one end of the hot and cold water mixing valve unit can be connected in a watertight manner to the interior of the hot and cold water mixing valve housing, and the flow control valve unit can be connected in a watertight manner to the interior of the flow control valve housing. As a result of the above, the hot and cold water mixing valve housing and the flow control valve unit can be simply assembled in a watertight manner by insertion into the valve device main body from one end thereof, and the flow control valve housing and the flow control valve unit can be simply assembled in a watertight manner by insertion into the valve device main body from the other end thereof.

Ease of assembly of the hot and cold water mixing valve device can thus be improved.

In addition, merely by respectively inserting the hot and cold water mixing valve housing and the flow control valve housing from one end and the other end of the valve device main body, respectively, and connecting one end of the hot and cold water mixing valve unit to the interior of the hot and cold water mixing valve housing to watertightly connect the flow control valve unit to the interior of the flow control valve housing, a simple flow path can be easily formed from the hot water inlet and the cold water inlet on the valve device main body.

Hence the need to install a complexly routed flow path in the valve device main body itself is eliminated, and ease of assembly and productivity can be improved while assuring watertightness in the hot and cold water mixing valve device.

In the present invention, preferably, the hot and cold water mixing valve housing and the flow control valve housing are substantially cylindrical; and the hot and cold water mixing valve housing includes a connecting portion configured to connect in a watertight manner with the one end of the cylindrical portion, and the flow control valve housing includes a connecting portion configured to connect in a watertight manner with the other end of the cylindrical portion; each channel is formed over an entire perimeter on an outer circumferential surface of each connecting portion of the hot and cold water mixing valve housing and the flow control valve housing; the hot and cold water mixing valve housing and the flow control valve housing respectively include one or more seal members disposed on the channels in the outer circumferential surfaces of the each connecting portion; the hot and cold water mixing valve housing and the cylindrical portion of the valve device main body are sealed in a watertight manner when the seal member of the hot and cold water mixing valve housing is disposed between the one end of the cylindrical portion and the channel on the connecting portion of the hot and cold water mixing valve housing, while the hot and cold water mixing valve housing is inserted from one end of the valve device main body into the valve device main body; and the flow control valve housing and the cylindrical portion of the valve device main body are connected in a watertight manner when the seal member of the flow control valve housing is disposed between the other end of the cylindrical portion and the channel on the connecting portion of the flow control valve housing, while the flow control valve housing is inserted from the other end of the valve device main body into the valve device main body.

According to the invention thus constituted, using each of the seal members provided on each channel in each connecting portion of the hot and cold water mixing valve housing and the flow control valve housing, a watertight connection can be made between one end of the cylindrical portion of the valve device main body and a channel on a connecting portion of the hot and cold water mixing valve housing, with the hot and cold water mixing valve housing inserted into the valve device main body from one end of the valve device main body. Also, a watertight connection can be made between the other end of the cylindrical portion of the valve device main body and the flow control valve housing with the flow control valve housing inserted into the valve device main body from the other end of the valve device main body.

Therefore using a simple structure whereby watertight sealing is accomplished by a seal in the radial direction of each connecting portion of the substantially cylindrical hot and cold water mixing valve housing and the flow control valve housing, the hot and cold water mixing valve unit and the flow control valve unit can respectively each be connected in a watertight manner to the cylindrical portion of the valve device main body.

Therefore ease of assembly and productivity can be improved, while assuring watertightness in a hot and cold water mixing valve device having a hot and cold water mixing valve unit and a flow control valve unit.

In the present invention, preferably, a plurality of openings are formed on an outer circumferential surface of the hot and cold water mixing valve housing, and water flowing in from the cold water inlet of the valve device main body is capable of flowing into a cold water inlet of the hot and cold water mixing valve unit through the openings of the hot and cold water mixing valve housing.

According to the invention thus constituted, a large amount of cold water can be made to flow in from a plurality of locations in the hot and cold water mixing valve unit, promoting the mixing of hot and cold water inside the hot and cold water mixing valve unit.

In the present invention, preferably, the openings are formed at equal spacing in a circumferential direction on the outer circumferential surface of the hot and cold water mixing valve housing.

According to the invention thus constituted, because the inflow locations at which cold water flows into the hot and cold water mixing valve unit are not unevenly distributed, unevenness of hot and cold water mixing inside the hot and cold water mixing valve unit can be avoided, and temperature adjustment functions by the hot and cold water mixing valve unit can be stabilized.

Also, by forming the plurality of openings on the outer circumferential surface of the hot and cold water mixing valve housing at equal spacing, when the hot and cold water mixing valve housing is assembled to the valve device main body, the cold water inflow locations can be disposed uniformly around the hot and cold water mixing valve housing regardless of the hot and cold water mixing valve housing directionality in the circumferential direction.

Thus the burden of adjusting the position of the hot and cold water mixing valve housing can be relieved and ease of assembly of the hot and cold water mixing valve device can be improved.

The present invention preferably further comprises a cylindrical hot and cold water mixing valve-holding housing configured to hold the hot and cold water mixing valve unit, the cylindrical hot and cold water mixing valve-holding housing being disposed at a separation outside in a longitudinal direction of the hot and cold water mixing valve housing; wherein the hot and cold water mixing valve-holding housing is supported in the valve device main body; one end of the hot and cold water mixing valve housing is supported on the cylindrical portion of the valve device main body, and the other end of the hot and cold water mixing valve housing is held by the hot and cold water mixing valve unit held by the hot and cold water mixing valve-holding housing; and the hot and cold water mixing valve-holding housing includes a hot water passageway port being configured to overlap both the hot water inlet of the valve device main body and the hot water inlet of the hot and cold water mixing valve unit.

According to the invention thus constituted has a tubular hot and cold water mixing valve-holding housing, separated in the long axis outward direction relative to the hot and cold water mixing valve housing, for holding the hot and cold water mixing valve unit. Also, this hot and cold water mixing valve-holding housing is supported by the valve device main body, and one end of the hot and cold water mixing valve housing is supported by the cylindrical portion of the valve device main body while the other end of the hot and cold water mixing valve housing is supported by the hot and cold water mixing valve unit held by the hot and cold water mixing valve-holding housing. The structure is thus one in which only one end of the hot and cold water mixing valve housing contacts one end of the cylindrical portion of the valve device main body and is supported in a watertight manner.

Therefore the number of locations for securing watertightness can be limited, and when inserting the hot and cold water mixing valve housing into the valve device main body, the hot and cold water mixing valve housing can be easily inserted therein.

Also, a hot water passageway overlapping both the hot water inlet on the valve device main body and the hot water inlet on the hot and cold water mixing valve unit is formed on the hot and cold water mixing valve-holding housing. By this means the hot water inlet of the valve device main body, the hot and cold water mixing valve-holding housing hot water passageway, and the hot water inlet of the hot and cold water mixing valve unit can be made to mutually overlap just by assembling the hot and cold water mixing valve housing, hot and cold water mixing valve unit, and hot and cold water mixing valve-holding housing respectively inside the valve device main body. Hence ease of assembly of the hot and cold water mixing valve device can be improved.

In addition, as a structure for supporting the hot and cold water mixing valve unit inside the valve device main body, a structure is adapted which supports by dividing between the two members consisting of the mutually separated hot and cold water mixing valve-holding housing and the hot and cold water mixing valve housing.

Hence mutual interference between the hot and cold water mixing valve-holding housing and the hot and cold water mixing valve housing as a result of the hot water flowing from the hot water inlet of the valve device main body through the hot water passageway in the hot and cold water mixing valve-holding housing and into the hot water inlet on the hot and cold water mixing valve unit can be prevented even if the hot and cold water mixing valve-holding housing or the hot and cold water mixing valve housing thermally expand.

Also, a passageway permitting communication between only the cold water inlet of the valve device main body and the cold water inlet of the hot and cold water mixing valve unit is formed between the valve device main body and the hot and cold water mixing valve-holding housing. Thus a hot and cold water mixing valve device can be achieved which will not be hot even if a user touches the valve device main body surface thereof when hot water is running through the hot water port on the hot and cold water mixing valve-holding housing.

In the present invention, preferably, the flow control valve unit is configured to be held inside the cylindrical portion when one end of the flow control valve unit is inserted from the other end of the valve device main body through the flow control valve housing, and the flow control valve unit includes an outlet configured to allow the hot and cold water mixture to flow out when the hot and cold water mixture flows into the flow control valve unit from a side of the hot and cold water mixing valve unit, and the flow control valve housing is disposed between the other end of the valve device main body and the other end of the cylindrical portion so that the outlet of the flow control valve unit and the outlet of the valve device main body directly overlap with each other.

According to the invention thus constituted, the length of the flow path between the outlet of the flow control valve unit and the outlet of the valve device main body can be minimized.

Hence the flow path inside the valve device main body can be a simple flow path, and the external dimensions of the valve device main body (e.g., the valve device main body outside diameter, etc.) can be made compact. Design characteristics of the hot and cold water mixing valve device can thus be improved.

Using the hot and cold water mixing valve housing a water passageway is also formed close to the outlet on the valve device main body between the valve device main body and the flow control valve housing. Thus a hot and cold water mixing valve device can be achieved which is not hot upon contact by a user with the surface of the valve device main body.

In the present invention, preferably, the flow control valve unit further includes: a valve seat member being cylindrical and being placed inside the cylindrical portion, the outlet of the flow control valve unit being formed on a circumferential surface of the valve seat member; and a valve member being cylindrical and being placed in the valve member so as to rotate coaxially in the valve seat member, one or more openings being formed on a circumferential surface of the valve member; wherein the valve member is configured to be switched between either an open state or a closed state depending on a rotational angle of the valve member, the open state being where the opening of the valve member and the outlet of the cylindrical valve seat member overlap in a radial direction of the valve member and the valve seat member, the closed state being where the circumferential surface of the valve member closes the outlet of the valve seat member; wherein the flow control valve unit further includes: an inlet path configured to allow the hot and cold water mixture which has passed through the hot and cold water mixing valve unit to flow into the valve member from a longitudinal direction of the flow control valve unit; and an outlet path where a flow is permitted in the open state from the opening of the valve member and from the outlet of the valve seat member; and the inlet path and the outlet path of the flow control valve unit are perpendicular to each other.

According to the invention thus constituted, in the open valve state after the hot and cold water mixture passes through the hot and cold water mixing valve unit and flows into the valve member of the flow control valve unit from the long axis direction of the flow control valve unit, it then passes through the valve member opening and out from the outlet of the valve seat member in the radial direction of the valve member and the valve seat member. It then flows out from the outlet on the valve device main body, which directly overlaps with the outlet of the flow control valve unit.

Also, the hot and cold water mixture inlet path and outlet path in the flow control valve unit are mutually perpendicular. There is hence no requirement to dispose a downstream-side flow path from the outlet of the flow control valve unit to the outlet of the valve device main body on the valve device main body, so the valve device main body can be made compact.

In the present invention, preferably, a central axis of the outlet on the valve device main body passes a midway position between a central axis of the hot water inlet of the valve device main body and a central axis of the cold water inlet of the valve device main body, or passes close to the midway position.

According to the present invention, the hot water inlet and the cold water inlet of the valve device main body are respectively disposed at substantially equal spacing relative to the outlet on the valve device main body.

Therefore design characteristics of the hot and cold water mixing valve device can be improved, and a user can more easily access the outlet from either of the two ends in the longitudinal direction of the hot and cold water mixing valve device.

In the present invention, preferably, the central axis of the outlet on the valve device main body passes through a center in a longitudinal direction of the valve device main body, or passes close to the center.

According to the invention thus constituted, the outlets of the valve device main body are formed at equal distances from the two ends in the longitudinal direction of the valve device main body.

Therefore design characteristics of the hot and cold water mixing valve device can be improved, and a user can more easily access the outlet from either of the two ends in the longitudinal direction of the hot and cold water mixing valve device.

According to the hot and cold water mixing valve device of the present invention, ease of assembly and productivity can be improved while assuring watertightness.

BRIEF DESCRIPTION OF THE DRAWINGS

FIG. 7 is a perspective view of a hot and cold water mixing valve housing according to an embodiment of the present invention.

FIG. 8 is a cross section along line VIII-VIII in FIG. 1.

EMBODIMENTS OF THE INVENTION

Detailed Description

Next, referring to the attached figures, a hot and cold water mixing valve device according to an embodiment of the invention is explained.

Figure 1:
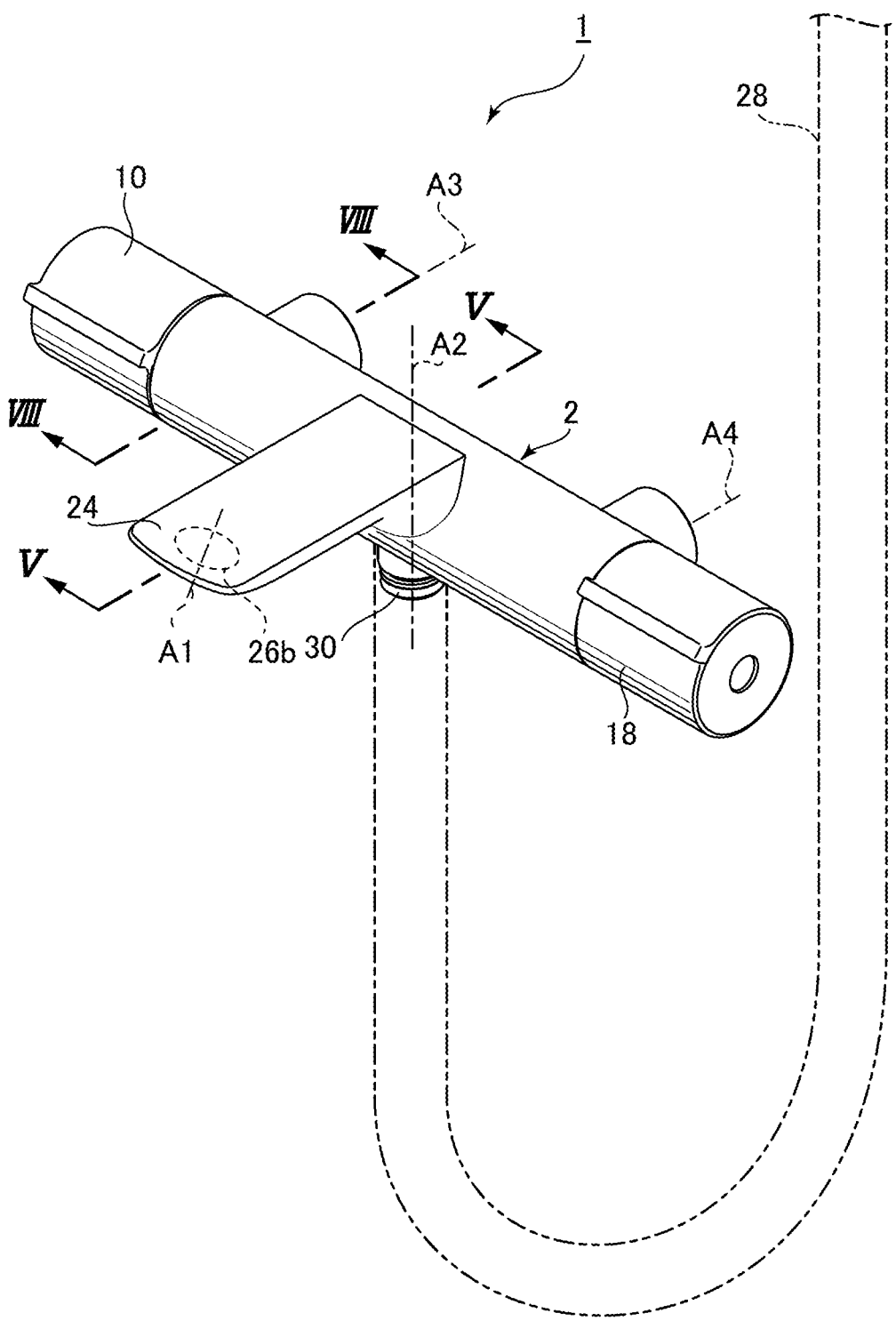
FIG. 1 is a summary perspective view of a hot and cold water mixing valve device according to an embodiment of the invention.
Figure 2:
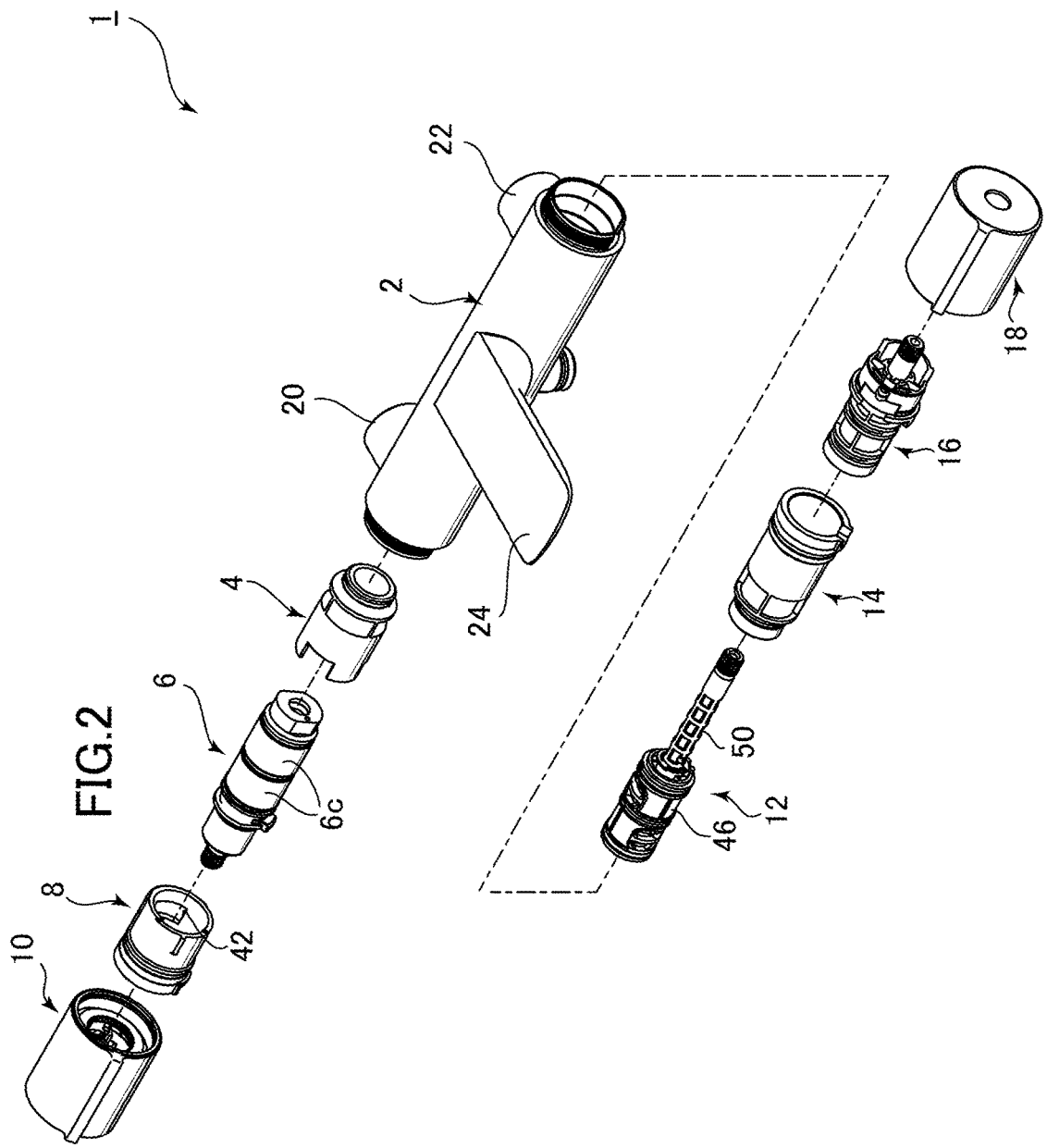
FIG. 2 is an exploded perspective view of a hot and cold water mixing valve device according to an embodiment of the invention.

First, FIG. 1 is a summary perspective view of a hot and cold water mixing valve device according to an embodiment of the invention, and FIG. 2 is an exploded perspective view of a hot and cold water mixing valve device according to an embodiment of the invention.

Figure 3:
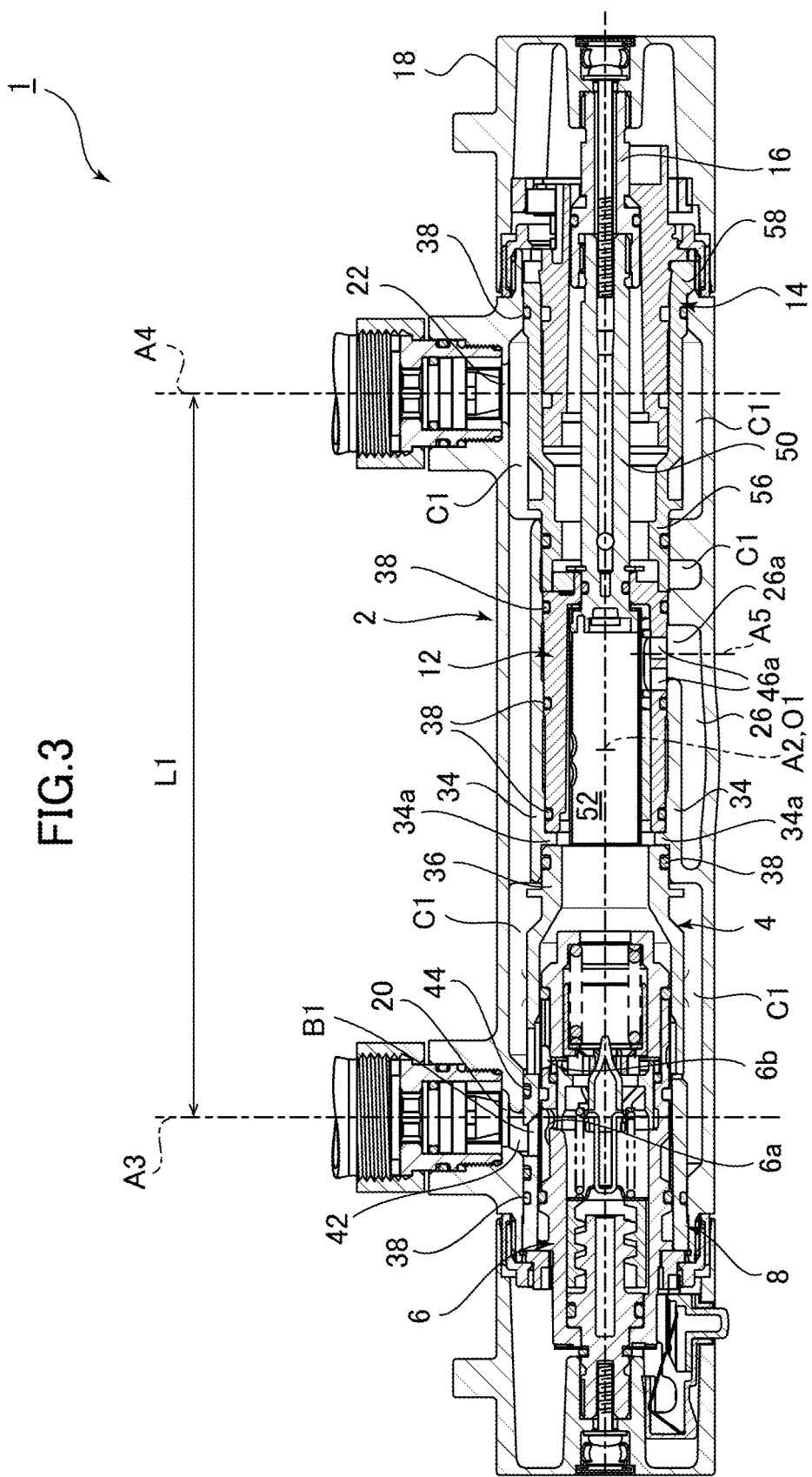
FIG. 3 is a plan view cross section of a hot and cold water mixing valve device according to an embodiment of the invention.
Figure 4:
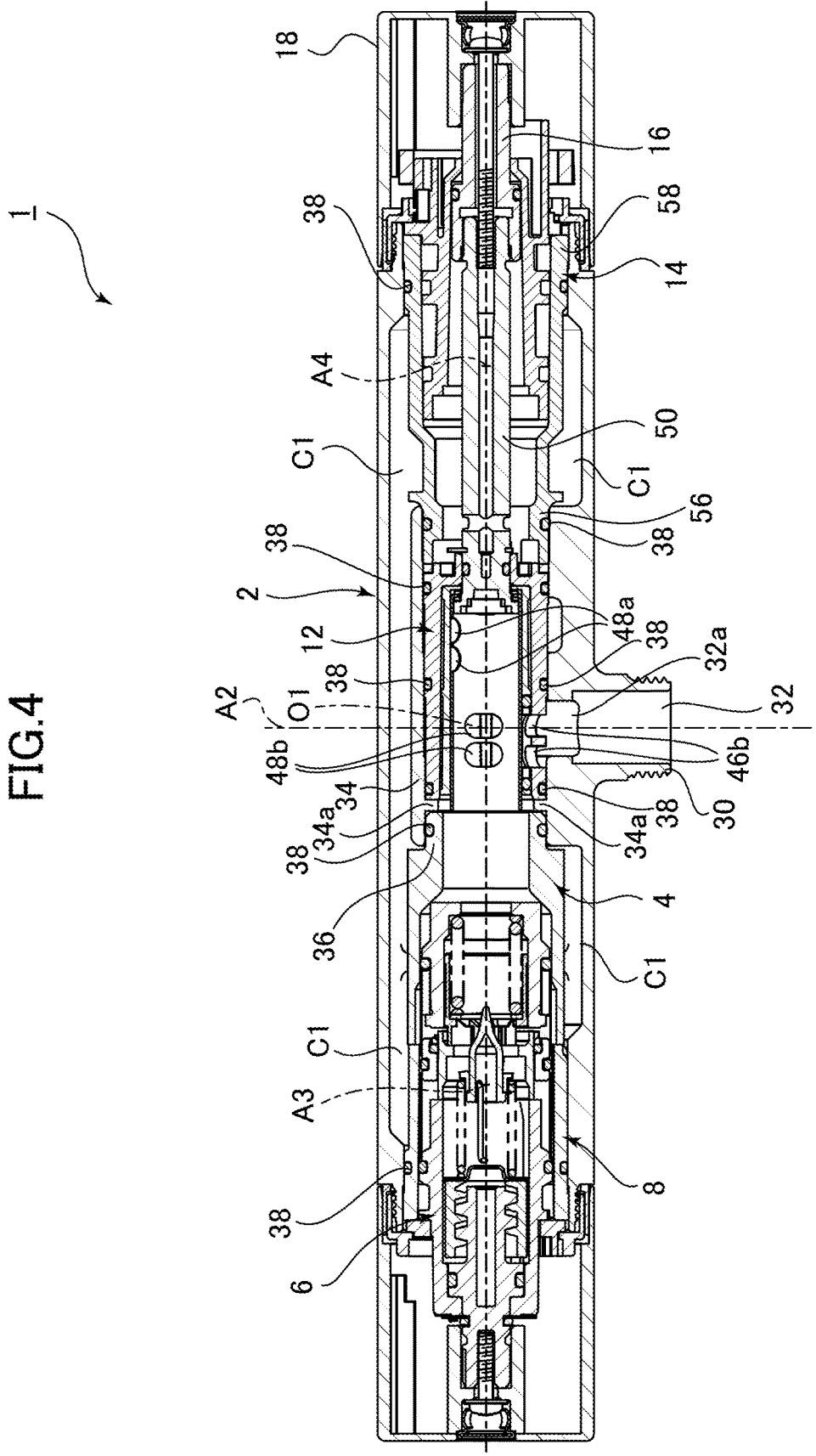
FIG. 4 is a front elevation cross section of a hot and cold water mixing valve device according to an embodiment of the invention.
Figure 5:
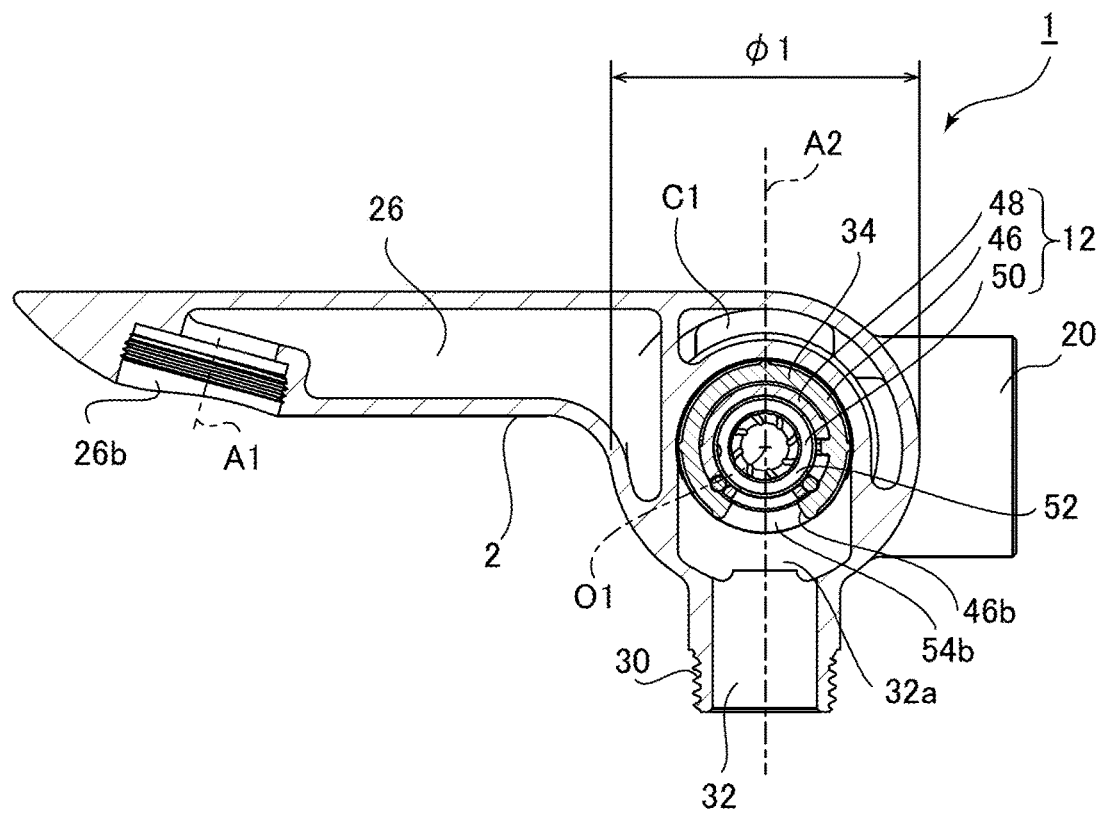
FIG. 5 is a center side-view cross section of a valve device main body according to an embodiment of the present invention along line V-V in FIG. 1.

Also, FIG. 3 is a plan view cross section of a hot and cold water mixing valve device according to an embodiment of the invention; FIG. 4 is a front elevation cross section of a hot and cold water mixing valve device according to an embodiment of the invention; and FIG. 5 is a center side-view cross section of a valve device main body according to an embodiment of the present invention along line V-V in FIG. 1.

First, as shown in FIGS. 1 through 4, the hot and cold water mixing valve device 1 includes: a valve device main body 2, a substantially cylindrical hot and cold water mixing valve housing 4 (details below) a substantially cylindrical hot and cold water mixing valve unit 6 for producing a hot and cold water mixture, a substantially cylindrical hot and cold water mixing valve-holding housing 8 (details below) for holding the hot and cold water mixing valve unit 6, and a hot water temperature control dial 10 for operating the hot and cold water mixing valve unit 6.

Next, as shown in FIGS. 1 and 2, the hot and cold water mixing valve device 1 according to an embodiment of the invention includes: a substantially cylindrical flow control valve unit 12 (details below) and flow control valve housing 14 (details below) for controlling the flow volume of the hot and cold water mixture, a connecting unit 16 connected to the flow control valve unit 12, and a spout water switching handle 18 for operating the flow control valve unit 12 through this connecting unit 16.

Next, referring to FIGS. 1 through 5, the specific structure of the valve device main body 2 is explained.

First, as shown in FIGS. 2 through 5, the valve device main body 2 is a metal cast part formed to extend horizontally in a substantially cylindrical shape.

A hot water inlet 20 into which hot water supplied from a hot water source (not shown) flows, and a cold water inlet 22 into which cold water supplied from a cold water supply source (not shown) flows, are respectively formed on the rear surface side of the valve device main body 2.

Also, as shown in FIGS. 1, 2, and 5, a spout 24 projecting on the front side is integrally formed over the center portion in the longitudinal direction of the valve device main body 2. A spouting discharge flow path 26 is formed inside this spout 24. The inlet to this spouting discharge flow path 26 is the spout outlet 26a, being the valve device main body 2 outlet, from which the hot and cold water mixture for spouting inside the valve device main body 2 is discharged. Also, the outlet to the spouting discharge flow path 26 is the spout water spouting port 26b formed at the tip portion of the spout 24.

In addition, as shown in FIGS. 1, 4, and 5, a shower hose connecting pipe 30, to which a shower hose 28 is connected, is integrally formed to project downward on the bottom of the center portion in the longitudinal direction of the valve device main body 2. Also, a shower spouting discharge flow path 32 is formed inside this shower hose connecting pipe 30. The inlet to this shower spouting discharge flow path 32 is the spouting outlet 32a, being a valve device main body 2 outlet, from which the hot and cold water mixture for shower spouting inside the valve device main body 2 is discharged. The spouting discharge flow path 26 outlet is positioned at the bottom end of the shower hose connecting pipe 30.

Also, as shown in FIGS. 3-5, a substantially cylindrical portion 34 extending in the long axis direction of the valve device main body 2 is integrally formed relative to the valve device main body 2 close to the center portion of the interior of the valve device main body 2, creating a double-pipe structure.

In addition, a protuberance 34a is formed over the entire perimeter on the inside circumferential surface close to one end portion of the cylindrical portion 34 (the end portion on the hot and cold water mixing valve housing 4 side), so that the inside diameter of the cylindrical portion 34 becomes smaller.

Note that in the present embodiment it is explained a form in which the valve device main body 2 is formed in a substantially cylindrical shape, but the valve device main body is not limited to a cylindrical shape, and so long as it is tube-shaped, the lateral cross section of the valve device main body may also have a rectangular cross section or an irregularly shaped cross section (elliptical, egg-shaped, etc.), for example.

Also, in the present embodiment it is explained a form in which the shower hose connecting pipe 30, to which the shower hose 28 is connected, is formed to project downward below the center portion in the longitudinal direction of the valve device main body 2, and the shower hose 28 is attached to the tip portion of this shower hose connecting pipe 30. However, in an acceptable variant example this shower hose connecting pipe 30 is caused to project on the top side of the center portion in the longitudinal direction of the valve device main body 2, becoming a portion of a "shower bar," being a rod-shaped member forming a shower pipe path extending vertically in place of the shower hose 28.

Next, referring to FIGS. 2 through 4, the hot and cold water mixing valve unit 6 is explained.

Figure 6:
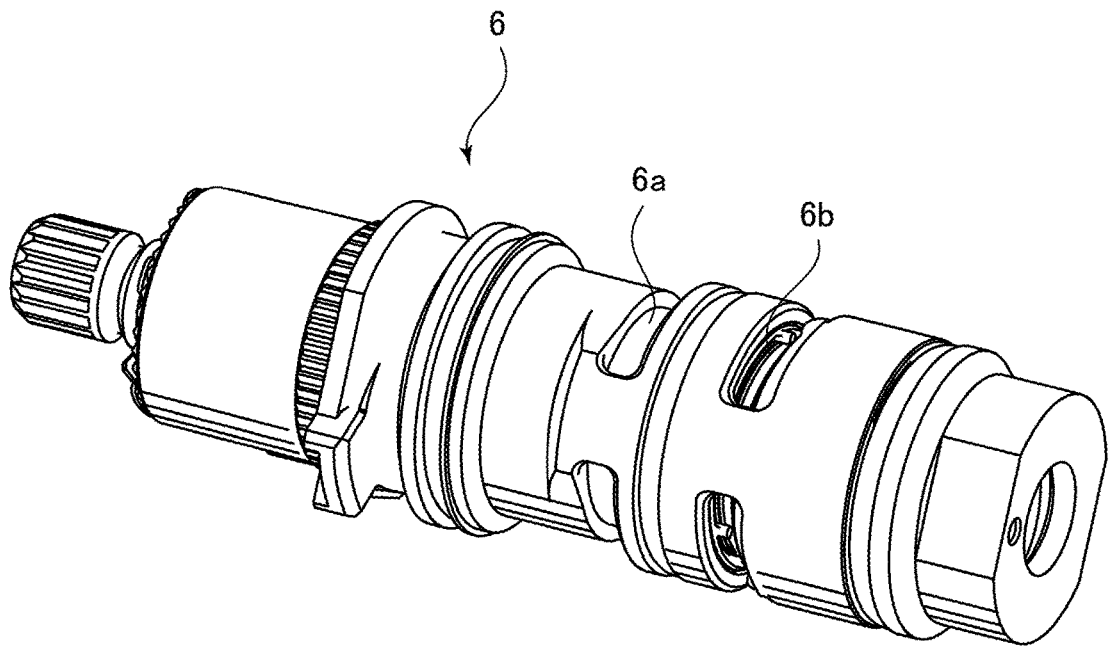
FIG. 6 is a perspective view of a hot and cold water mixing valve unit according to an embodiment of the present invention.

FIG. 6 is a perspective view of a hot and cold water mixing valve unit according to an embodiment of the present invention.

Here the hot and cold water mixing valve unit 6 shown in FIG. 6 is shown with the screen member 6c (see FIG. 2) for covering the hot water inlet 6a and the cold water inlet 6b thereof removed.

As shown in FIGS. 2 through 4 and FIG. 6, the hot and cold water mixing valve unit 6 is inserted from one end of the valve device main body 2 (the left end portion in the longitudinal direction of the valve device main body 2 shown in FIGS. 3 and 4) and housed in the valve device main body 2; a hot and cold water mixture is produced by controlling the amount of hot water supplied from the hot water inlet 20 of the valve device main body 2 and the amount of cold water supplied from the cold water inlet 22 of the valve device main body 2 and mixing those, thereby also controlling the temperature of this hot and cold water mixture.

Note that the structure of the hot and cold water mixing valve unit 6 is the same as in the past, therefore a specific explanation thereof is here omitted. To briefly explain the components built into the hot and cold water mixing valve unit 6, a movable valve body for adjusting the respective opening angles of the hot water inlet 6a and the cold water inlet 6b (see FIG. 6) on the hot and cold water mixing valve unit 6 is built into same. Also, a bias spring is built into same, for biasing the movable valve body by operating the hot water temperature control dial 10 when positioning this movable valve body. Further, a heat-sensing spring or the like is built into same, for controlling the biasing force biasing the movable valve body in response to the temperature of the hot and cold water mixture mixed in the hot and cold water mixing valve unit 6.

Next, referring to FIGS. 2 through 5 and FIG. 7, the hot and cold water mixing valve housing 4 is explained.

FIG. 7 is a perspective view of a hot and cold water mixing valve housing according to an embodiment of the present invention.

As shown in FIGS. 2 through 4 and FIG. 7, the hot and cold water mixing valve housing 4 includes a connecting portion 36 (see FIG. 7) forming a watertight connection to one end of the cylindrical portion 34 (the left end portion of the cylindrical portion 34 shown in FIGS. 3 and 4) by insertion from one end of the valve device main body 2 (the left end portion of the valve device main body 2 shown in FIGS. 3 and 4). This connecting portion 36 is connected to one end of the valve device main body 2 cylindrical portion 34.

More specifically, a channel 36a (see FIG. 7) is formed over the entire perimeter of the outer circumferential surface of the hot and cold water mixing valve housing 4 connecting portion 36, as shown in FIGS. 3, 4, and 7. An O-ring 38 (see FIGS. 3 and 4), being a seal member, is let into the channel 36a.

Thus with the hot and cold water mixing valve housing 4 inserted into the valve device main body 2 from one end of the valve device main body 2, one end surface in the axial direction of the connecting portion 36 contacts the end surface (the left side end surface of the protuberance 34a shown in FIG. 3) on one side in the axial direction of the protuberance 34a inside the cylindrical portion 34 facing it in the axial direction. Also, a watertight connection is made by the O-ring 38 between the inside circumferential surface of the valve device main body 2 cylindrical portion 34 and the channel 36a on the connecting portion 36 of the hot and cold water mixing valve housing 4.

Note that in the present embodiment it is explained a form in which the O-ring 38 is used as a seal member mounted on the connecting portion 36 of the hot and cold water mixing valve housing 4, but a non-O-ring seal member such as fillet packing may also be used.

Next, as shown in FIG. 7, a plurality of openings 40 are formed at equal spacing in the circumferential direction of the hot and cold water mixing valve housing 4 on the outer circumferential surface of the end portion of on the hot and cold water mixing valve-holding housing 8 side of the hot and cold water mixing valve housing 4. Cold water which has flowed in from the cold water inlet 22 of the valve device main body 2 can thus flow into the cold water inlet 6b on the hot and cold water mixing valve unit 6 from the respective openings 40 on the hot and cold water mixing valve housing 4.

Note that in the present embodiment the openings 40 on the hot and cold water mixing valve housing 4 are formed at equal spacing in the circumferential direction. However, the openings 40 do not necessarily have to be disposed at equal spacing so long as uneven mixing of the hot and cold water in the hot and cold water mixing valve unit 6 is suppressed.

Next, referring to FIGS. 2 through 4 and FIGS. 8 and 9, the hot and cold water mixing valve-holding housing 8 is explained.

Figure 9:
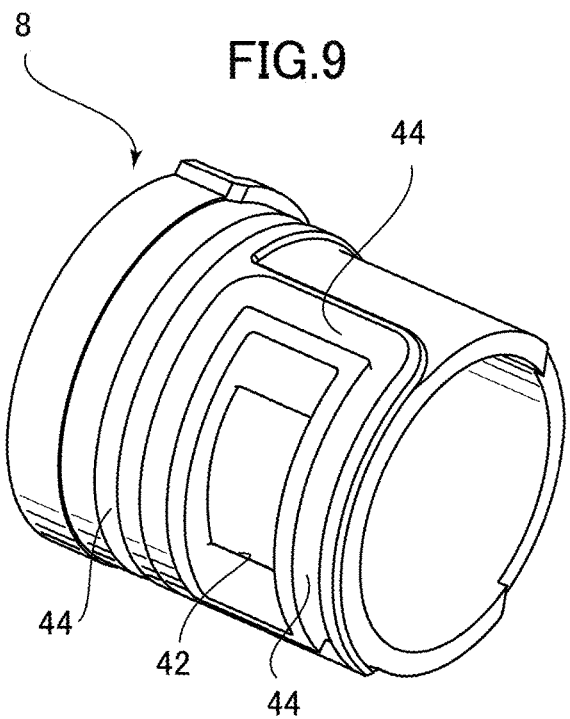
FIG. 9 is a perspective view of a hot and cold water mixing valve-holding housing according to an embodiment of the present invention.

FIG. 8 is a cross section along line VIII-VIII in FIG. 1; FIG. 9 is a perspective view of a hot and cold water mixing valve-holding housing according to an embodiment of the present invention.

As shown in FIGS. 2 through 4 and FIGS. 8 and 9, the hot and cold water mixing valve-holding housing 8 for holding the hot and cold water mixing valve unit 6 is disposed to be separated from the outside end portion in the long axis direction of the hot and cold water mixing valve housing 4, and is supported inside the valve device main body 2 close to the hot water inlet 20.

Also formed in the hot and cold water mixing valve-holding housing 8 is a hot water port 42 (see FIG. 2, FIG. 3, FIG. 8, and FIG. 9) overlapping both the hot water inlet 20 (see FIG. 8) and the hot water inlet 6a (see FIG. 6) of the hot and cold water mixing valve unit 6 of the valve device main body 2.

In addition, as shown in FIG. 9, a channel 44 in which the O-ring 38 is held (see FIGS. 3, 4, and 8) is formed on the outer perimeter portion surrounding the outer circumferential surface of the hot and cold water mixing valve-holding housing 8 and the hot water port 42, etc. Watertightness between the inside surface of the valve device main body 2 and the outer circumferential surface of the hot and cold water mixing valve-holding housing 8 is thus maintained by the O-ring 38 held in this channel 44.

Next, referring to FIGS. 2-5, FIG. 10, and FIG. 11, the flow control valve unit 12 and the flow control valve housing 14 are explained.

Figure 10:
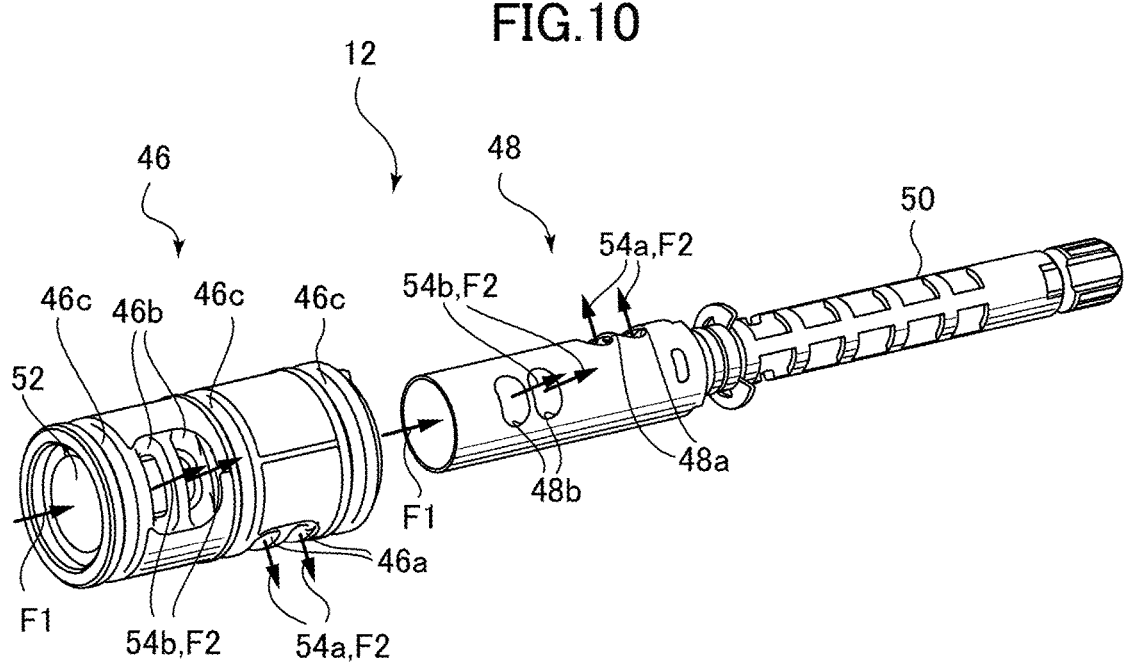
FIG. 10 is a perspective view of a flow control valve unit according to an embodiment of the present invention.

FIG. 10 is a perspective view of a flow control valve unit according to an embodiment of the present invention.

First, as shown in FIGS. 2-5 and FIG. 10, the flow control valve unit 12 is inserted from the other end of the valve device main body 2 (the right end portion in the longitudinal direction of valve device main body 2 shown in FIGS. 3 and 4), and thus housed in the valve device main body 2.

Specifically, as shown in FIG. 10, the flow control valve unit 12 includes a cylindrical valve seat member 46, inserted at one end from the other end of the cylindrical portion 34 (the right side of the cylindrical portion 34 shown in FIGS. 3 and 4) and held in a watertight manner inside the cylindrical portion 34, and a cylindrical valve member 48 arranged so as to be rotatable on the same axis within this valve seat member 46.

Also, as shown in FIGS. 3, 4, and 10, a plurality of outlets 46a for spouting water and outlets 46b for spouting shower water, being outlets on the flow control valve unit 12, are respectively formed on the circumferential surface of the valve seat member 46.

Furthermore, openings 48a for spouting water and openings 48b for spouting shower water, being openings in the valve member 48 respectively communicating with the valve seat member 46 outlets 46a and outlets 46b, are respectively formed on the circumferential surface of the valve member 48, as well.

Also, as shown in FIGS. 3, 4, and 10, a plurality of channels 46c are formed over the entire perimeter on the outer circumferential surface of the valve seat member 46. Also, an O-ring 38, being a seal member, is respectively held in each of the channels 46c. One end surface in the axial direction of the valve seat member 46 (the left end surface of the valve seat member 46 shown in FIGS. 3 and 4) contacts one side end surface (the right end surface of the protuberance 34a shown in FIGS. 3 and 4) in the axial direction of the protuberance 34a inside the cylindrical portion 34 which opposes it in the axial direction. Watertightness is maintained between the inner circumferential surface of the valve device main body 2 cylindrical portion 34 and the outer circumferential surface of the valve seat member 46.

Also, as shown in FIGS. 2-5 and FIG. 10, the flow control valve unit 12 is linked at one end in the axial direction to the valve member 48, and includes a rotary shaft member 50. This rotary shaft member 50 is connected through the connecting unit 16 to the spout water switching handle 18.

Also, the valve member 48 can, in response to the spout water switching handle 18 and the rotary angle of the rotary shaft member 50, be switched to an open valve state for spouting water, whereby the openings 48*a* of the valve member 48 and the valve seat member 46 outlets 46*a* overlap in the radial direction of the valve member 48 and the valve seat member 46. Alternatively, the valve member 48 can be switched to a shower spouting open valve state in which the valve member 48 openings 48*b* and the valve seat member 46 outlets 46*b* overlap in the radial direction of the valve member 48 and the valve seat member 46. Or it may be switched to a closed valve state in which the circumferential surface of the valve member 48 closes off each of the outlets 46*a* and 46*b* on the valve seat member 46.

In addition, as shown in FIGS. 3-5 and FIG. 10, an inlet path 52 of the flow control valve unit 12 is formed in the flow control valve unit 12, through which the hot and cold water mixture which has passed through the interior of the hot and cold water mixing valve unit 6 flows into the valve member 48 from the long axial direction of the flow control valve unit 12.

Also, as shown in FIGS. 3-5 and FIG. 10, an outlet path 54*a* for spouting water flowing out from the openings 48*a* of the valve member 48 and the valve seat member 46 outlets 46*a* in the open state is formed on the flow control valve unit 12. Alternatively, an outlet path 54*b* for spouting shower water flowing out from the valve member 48 openings 48*b* and the valve seat member 46 outlets 46*b* in the open state is formed.

Here, as shown in FIG. 10, the direction F1 of the inlet path 52 of the flow control valve unit 12 is the long axis direction of the valve seat member 46 and valve member 48, and the direction F2 of the outlet paths 54*a* and 54*b* is the radial outside direction of the valve seat member 46 and the valve member 48, respectively. Thus the inlet path 52 and the outlet path 54 in the flow control valve unit 12 are perpendicular to one another.

Note that in the present embodiment, as the flow control valve unit 12 for controlling the flow volume of the hot and cold water mixture, a device having the function of switching between water spouting and shower spouting is explained. For spouting spout water or spouting shower water alone, however, this may also be a flow control valve unit formed simply from a simple switching valve or on/off valve, etc.

Figure 11:
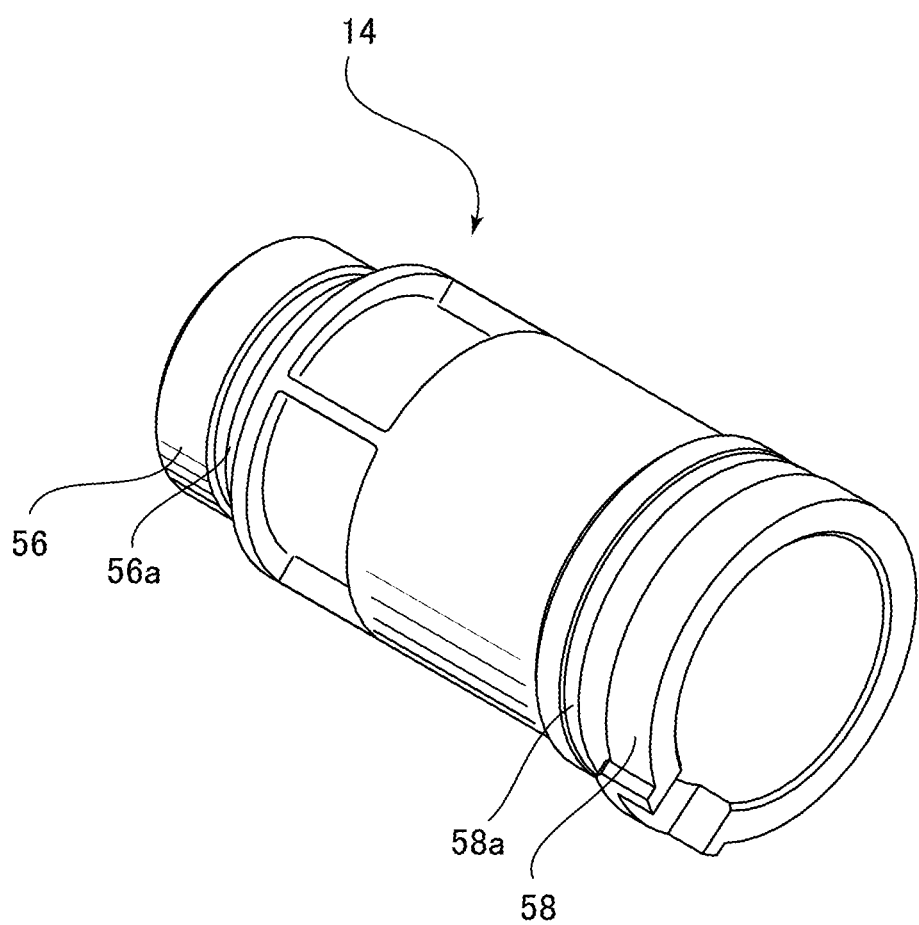
FIG. 11 is a perspective view of a flow control valve housing according to an embodiment of the present invention.

Next, FIG. 11 is a perspective view of a flow control valve housing according to an embodiment of the present invention.

As shown in FIGS. 2-4 and FIG. 11, the flow control valve housing 14 is a substantially cylindrical member including a connecting portion 56 which, with one of its ends inserted from the other end of the valve device main body 2 (the right end portion in the longitudinal direction of the valve device main body 2 shown in FIGS. 3 and 4), connects to the other end portion inside the cylindrical portion 34, and a connecting portion 58 on the other end, connected to the inside surface of the other end portion of the valve device main body 2. Also, the rotary shaft member 50 and the connecting unit 16 of the flow control valve unit 12 are held inside the flow control valve housing 14.

Channels 56*a*, 58*a*, into which the O-rings 38 serving as seal members are let in, are formed over the entire perimeter of the respective outer circumferential surfaces of the connecting portions 56 and 58 on the flow control valve housing 14, but no opening or the like penetrating the outer circumferential surface of the flow control valve housing 14 is provided.

In addition, a watertight connection is formed by each of the O-rings 38 let into each of the channels 56*a* and 58*a* in the flow control valve housing 14 between the outer circumferential surface of the connecting portion 56 at one end of the flow control valve housing 14 and the inner circumferential surface at the other end of the cylindrical portion 34 of the valve device main body 2 (the right end portion in the longitudinal direction of the valve device main body 2 cylindrical portion 34 shown in FIGS. 3 and 4). Also, a watertight connection is made by the O-rings 38 between the outer circumferential surface of the connecting portion 58 at the other end of the flow control valve housing 14 and the other end inside the valve device main body 2 (the right end portion in the longitudinal direction of the valve device main body 2 shown in FIGS. 3 and 4).

Thus, as shown in FIGS. 3-5, the outlets 46*a* for spouting water on the flow control valve unit 12 and the spout outlet 26*a* downstream thereof for spouting water on the valve device main body 2 directly overlap one another. The flow control valve housing 14 is disposed between the other end of the valve device main body 2 and the other end of the cylindrical portion 34 so that the outlets 46*b* for spouting shower water on the flow control valve unit 12 and the spouting outlet 32*a* for spouting shower water on the downstream side thereof directly overlap one another.

I.e., the flow control valve housing 14 functions as a spacer for disposing the flow control valve unit 12 inside the valve device main body 2 cylindrical portion 34 so that each of the outlets 46*a*, 46*b* on the flow control valve unit 12 and each of the spout outlets 26*a*, 32*a* on the valve device main body 2 directly overlap one another.

Next, as shown in FIG. 1 and FIGS. 3-5, in the hot and cold water mixing valve device 1 of the present embodiment the central axis A1 of the water spouting spout port 26*b* and the central axis A2 of the shower spouting outlet 32*a* of the valve device main body 2 are arranged to pass midway between the central axis A3 of the hot water inlet 20 and the central axis A4 of the cold water inlet 22 of the valve device main body 2. However, an arrangement is also acceptable whereby these pass through at a position close to midway between the central axis A3 and the central axis A4.

Note that in the present embodiment a distance of 90 mm or 150 mm, for example, is preferable as the distance L1 (see FIG. 3) between the central axis A3 of the hot water inlet 20 and the central axis A4 of the cold water inlet 22 of the valve device main body 2.

As shown in FIG. 1 and FIGS. 3-5, in the hot and cold water mixing valve device 1 of the present embodiment the central axis A2 of the shower spouting outlet 32*a* on the valve device main body 2 is arranged to pass through the center O1 in the longitudinal direction of the valve device main body 2. However it is also acceptable for the line to pass through at a position close to this center O1.

In addition, as a variant example, the central axis A5 (see FIG. 3) of the spout outlet 26*a* may be set to pass through the center O1 in the longitudinal direction of the valve device main body 2.

Next, referring to FIGS. 2-4, an assembly method for a hot and cold water mixing valve device 1 according to an embodiment of the invention is explained.

As shown in FIGS. 2-4, when assembling a hot and cold water mixing valve device 1 according to the present embodiment, the hot and cold water mixing valve housing 4, hot and cold water mixing valve unit 6, and hot and cold water mixing valve-holding housing 8 are first inserted from one end of the valve device main body 2 (the left end portion in the longitudinal direction of the valve device main body 2 shown in FIGS. 3 and 4). Thus the hot and cold water mixing valve housing 4 connecting portion 36 is connected in a watertight manner through the O-ring 38 to one end within the valve device main body 2 cylindrical portion 34. At the same time, the hot and cold water mixing valve-holding housing 8 is held in a watertight manner mediated by an O-ring 38 at one end portion inside the valve device main body 2 so that the hot water port 42 of the hot and cold water mixing valve-holding housing 8 and the hot water inlet 20 inside the valve device main body 2 directly overlap.

Thus within the valve device main body 2, the hot and cold water mixing valve unit 6 is supported in a watertight manner by two members: the mutually separated hot and cold water mixing valve housing 4 and the hot and cold water mixing valve-holding housing 8.

Here, when the hot and cold water mixing valve housing 4, hot and cold water mixing valve unit 6, and hot and cold water mixing valve-holding housing 8 are inserted from one end of the valve device main body 2, it is acceptable that they be inserted as a single component in which these three parts 4, 6, and 8 are pre-assembled, or that the hot and cold water mixing valve unit 6 and hot and cold water mixing valve-holding housing 8 be separately inserted in sequence after first inserting the stand-alone hot and cold water mixing valve housing 4.

Next, as shown in FIGS. 2 through 4, the flow control valve unit 12, flow control valve housing 14, and connecting unit 16 are inserted from the other end of the valve device main body 2 (the right side portion in the longitudinal direction of the valve device main body 2 shown in FIGS. 3 and 4). Thus the flow control valve unit 12 valve seat member 46 is inserted from the other end of the valve device main body 2 cylindrical portion 34 with the valve member 48 assembled into its interior, and this valve seat member 46 and valve member 48 are held in a watertight manner within the cylindrical portion 34, mediated by an O-ring 38.

Also, one end of the flow control valve housing 14 is connected in a watertight manner to the other end inside the valve device main body 2 cylindrical portion 34, mediated by an O-ring 38, and the flow control valve housing 14 is disposed between the other end of the valve device main body 2 and the other end of the cylindrical portion 34.

By this means, the outlets 46a for spouting water on the flow control valve unit 12 and the spout outlet 26a downstream thereof for spouting water on the valve device main body 2 directly overlap one another. At the same time, the flow control valve unit 12 outlets 46b and the valve device main body 2 shower spouting outlet 32a downstream thereof directly overlap one another.

Therefore the hot and cold water mixing valve unit 6 is disposed to be able to communicate with only the flow control valve unit via the hot and cold water mixing valve housing 4 on the downstream side thereof. Also, the flow control valve unit 12 is disposed so that its downstream side can communicate with only the spouting discharge flow paths 26, 32, which include each of the spout outlets 26a, 32a on the valve device main body 2.

Also, inside the valve device main body 2 of a hot and cold water mixing valve device 1 in which the components above have been fully assembled, a hot water passageway B1 (see FIGS. 3 and 8) is formed for achieving communication between only the hot water inlet 20 of the valve device main body 2 and the hot water inlet 6a of the hot and cold water mixing valve unit 6. A water passageway C1 (see FIGS. 3 and 5) is also formed, permitting communication between only the cold water inlet 22 of the valve device main body 2 and the cold water inlet 6b of the hot and cold water mixing valve unit 6. Water passages C1 are also respectively formed between the valve device main body 2 and the flow control valve housing 14 (see FIGS. 3 and 4), between the valve device main body 2 and the cylindrical portion 34 (see FIGS. 3-5), between the valve device main body 2 and the hot and cold water mixing valve housing 4 (see FIGS. 3 and 4), and between the valve device main body 2 and the hot and cold water mixing valve-holding housing 8 (see FIGS. 3, 4, and 8).

Thus since water in the water passageway C1 is made to flow on the outermost circumference of the inside of the valve device main body 2, a hot and cold water mixing valve device 1 can be achieved in which the valve device main body 2 is not hot even if a user contacts its surface.

In the hot and cold water mixing valve device 1 according to the above-described embodiment of the invention, with the hot and cold water mixing valve housing 4 and hot and cold water mixing valve unit 6 inserted from one end of the valve device main body 2, and the flow control valve housing 14 and the flow control valve unit 12 inserted from the other end of the valve device main body 2, a hot water passageway B1 permitting communication between only the hot water inlet 20 of the valve device main body 2 and the hot water inlet 6a of the hot and cold water mixing valve unit 6, and a water passageway C1 permitting communication between only the cold water inlet 22 of the valve device main body 2 and the cold water inlet 6b of the hot and cold water mixing valve unit 6, are formed on the interior of the valve device main body 2. Also, these water passageways C1 are formed between the valve device main body 2 and the flow control valve housing 14, between the valve device main body 2 and the valve device main body 2 cylindrical portion 34, and between the valve device main body 2 and the hot and cold water mixing valve housing 4. By the above means, water in the water passageway C1 is made to flow on the outermost circumference of the inside of the valve device main body 2, so a hot and cold water mixing valve device 1 can be achieved whereby the valve device main body 2 will not be hot if a user contacts its surface.

There is also a hot and cold water mixing valve housing 4 capable of connecting in a watertight manner to one end of the cylindrical portion 34 by insertion from one end of the valve device main body 2, and a flow control valve housing 14 capable of connecting in a watertight manner to the other end of the cylindrical portion 34 by insertion from the other end of the valve device main body 2. Also, one end of the hot and cold water mixing valve unit 6 can be connected in a watertight manner to the interior of the hot and cold water mixing valve housing 4, and the flow volume control valve unit 12 can be connected in a watertight manner to the interior of the flow volume control valve housing 14. The hot and cold water mixing valve housing 4 and the flow control valve housing 14 can thus be easily inserted into the valve device main body 2 from one end of the valve device main body 2 for a watertight assembly. Moreover, the flow control valve housing 14 and the flow control valve unit 12 can be easily inserted into the valve device main body 2 from the other end of the valve device main body 2 for a watertight assembly.

Ease of assembly of the hot and cold water mixing valve device 1 can thus be improved.

Thus in a hot and cold water mixing valve device 1 according to the present embodiment, by using each of the O-rings 39 (seal members) disposed in the channel 36a formed on the connecting portion 36 between the valve device main body 2 cylindrical portion 34 and the hot and cold water mixing valve housing 4, and in the channel 56a formed on the connecting portion 56 between the flow control valve housing 14 and the valve device main body 2 cylindrical portion 34, a watertight connection can be made between one end of the valve device main body 2 cylindrical portion 34 with the hot and cold water mixing valve housing 4 inserted into the valve device main body 2 from one end of the valve device main body 2, and the channel 36*a* of the connecting portion 36 on the hot and cold water mixing valve housing 4. Also, a watertight connection can be made between the other end of the valve device main body 2 cylindrical portion 34 and the channel 56*a* on the connecting portion 56 at one end of the flow control valve housing 14, with the flow control valve housing 14 inserted into the valve device main body 2 from the other end of the valve device main body 2.

Therefore by using a simple structure whereby watertight sealing is accomplished by a seal in the radial direction of each connecting portion 36, 56 of the substantially cylindrical hot and cold water mixing valve housing 4 and the flow control valve housing 14, the hot and cold water mixing valve unit 6 and the flow control valve unit 12 can respectively each be connected in a watertight manner to the cylindrical portion 34 of the valve device main body 2.

As a result of the above, ease of assembly and productivity can be improved while assuring watertightness in a hot and cold water mixing valve device 1 with a hot and cold water mixing valve unit 6 and a flow control valve unit 12.

In addition, by using a hot and cold water mixing valve device 1 according to the present embodiment, a plurality of openings 40 are formed on the outer circumferential surface at the end portion of the hot and cold water mixing valve-holding housing 8 in the hot and cold water mixing valve housing 4. Cold water which has flowed in from the cold water inlet 22 of the valve device main body 2 can also flow from the openings 40 on the hot and cold water mixing valve housing 4 into the cold water inlet 6*b* on the hot and cold water mixing valve unit 6. Thus a large amount of cold water can be made to flow in from a plurality of locations in the hot and cold water mixing valve unit 6, promoting the mixing of hot and cold water inside the hot and cold water mixing valve unit 6.

Also, by using a hot and cold water mixing valve device 1 according to the present embodiment, the openings 40 on the hot and cold water mixing valve housing 4 are formed at equal spacing in the circumferential direction. Due to the above, the inflow locations at which cold water flows into the hot and cold water mixing valve unit 6 are not unevenly distributed, therefore unevenness of hot and cold water mixing inside the hot and cold water mixing valve unit 6 can be avoided, and temperature adjustment functions by the hot and cold water mixing valve unit 6 can be stabilized.

Also, the openings 40 are formed at equal spacing on the outer circumferential surface of the hot and cold water mixing valve housing 4. Thus when the hot and cold water mixing valve housing 4 is assembled to the valve device main body 2, water inflow locations can be disposed at equal spacing in the circumferential direction relative to the hot and cold water mixing valve unit 6, regardless of the direction of assembly in the circumferential direction of the hot and cold water mixing valve housing 4.

Therefore the burden of adjusting the position of the hot and cold water mixing valve housing can be relieved and ease of assembly of the hot and cold water mixing valve device improved.

In addition, the hot and cold water mixing valve device 1 according to the present embodiment has a cylindrical hot and cold water mixing valve-holding housing 8, separated toward the outside in the long axis direction relative to the hot and cold water mixing valve housing 4, for holding the hot and cold water mixing valve unit 6. Also, this hot and cold water mixing valve-holding housing 8 is supported on the valve device main body 2, and one end of the hot and cold water mixing valve housing 4 is supported on the valve device main body 2 cylindrical portion 34. In addition, the other end of the hot and cold water mixing valve housing 4 is supported on the hot and cold water mixing valve unit 6, which is held by the hot and cold water mixing valve-holding housing 8. Thus in this structure only one end of the hot and cold water mixing valve housing 4 contacts one end of the cylindrical portion 34 of the valve device main body 2 and is supported in a watertight manner.

Therefore the number of locations at which watertightness must be provided can be limited, and when inserting the hot and cold water mixing valve housing 4 into the valve device main body 2, the hot and cold water mixing valve housing 4 can be easily inserted therein.

Also, a hot water passageway overlapping both the hot water inlet 20 on the valve device main body 2 and the hot water inlet 6*a* on the hot and cold water mixing valve unit 6 is formed on the hot and cold water mixing valve-holding housing 8. By this means, the hot water inlet 20, the hot water port 42 of the hot and cold water mixing valve-holding housing 8, and the hot water inlet 6*a* of the hot and cold water mixing valve unit 6 can be made to mutually overlap simply by assembling the hot and cold water mixing valve housing 4, the hot and cold water mixing valve unit 6, and the hot and cold water mixing valve-holding housing 8 inside the valve device main body 2.

Ease of assembly of the hot and cold water mixing valve device 1 can thus be improved.

In addition, as a structure for supporting the hot and cold water mixing valve unit 6 inside the valve device main body 2, a structure is adapted which supports by dividing between the two members consisting of the mutually separated hot and cold water mixing valve-holding housing 8 and the hot and cold water mixing valve housing 4. The hot and cold water mixing valve-holding housing 8 and the hot and cold water mixing valve housing 4 can thus be prevented from interfering with one another even if the hot and cold water mixing valve-holding housing 8 or the hot and cold water mixing valve housing 4 thermally expand due to hot water flowing from the hot water inlet 20 through the hot water port 42 of the hot and cold water mixing valve-holding housing 8 and out of the hot water inlet 6*a* of the hot and cold water mixing valve unit 6.

Also, a passageway C1 permitting communication between only the cold water inlet 22 of the valve device main body 2 and the cold water inlet 6*b* of the hot and cold water mixing valve unit 6 is formed between the valve device main body 2 and the hot and cold water mixing valve-holding housing 8. Thus a hot and cold water mixing valve device 1 can be achieved which will not be hot even if a user touches the valve device main body 2 surface thereof when hot water is running through the hot water port 42 on the hot and cold water mixing valve-holding housing 8.

Also, using a hot and cold water mixing valve device 1 according to the present embodiment, the flow control valve unit 12 is held inside the valve device main body 2 cylindrical portion 34 with one end thereof inserted from the other end of the valve device main body 2, mediated by the flow control valve housing 14. The flow control valve unit 12 also includes outlets 46*a*, 46*b* for causing the hot and cold water mixture flowing in from the hot and cold water mixing valve unit 6 side to flow out. In addition, the flow control valve housing 14 is disposed between the other end of the valve device main body 2 and the other end of the cylindrical portion 34 so that each of the outlets 46a, 46b on the flow control valve unit 12 and each of the spout outlets 26a, 32a on the valve device main body 2 directly overlap one another. This enables the flow paths between each of the outlets 46a, 46b on the flow control valve unit 12 and each of the discharge flow paths 26, 32 on the valve device main body 2 to be formed at the minimum length.

Hence the flow path inside the valve device main body 2 can be a simple flow path, and the external dimensions of the valve device main body 2 (e.g., the valve device main body 2 outside diameter φ1 (see FIG. 5), etc.) can be made compact. Design characteristics of the hot and cold water mixing valve device 1 can thus be improved.

Note that the valve device main body 2 outside diameter φ1 of 45 mm, for example, is preferable.

By using the flow control valve housing 14, a water passageway C1 is formed close to each of the spout outlets 26a, 32a on the valve device main body 2 between the valve device main body 2 and the flow control valve housing 14. Thus a hot and cold water mixing valve device 1 can be achieved which is not hot upon contact by a user with the surface of the valve device main body 2.

Also, in the hot and cold water mixing valve device 1 according to the present embodiment, the flow control valve unit 12 further includes a cylindrical valve seat member 46, disposed inside the valve device main body 2 cylindrical portion 34, on the circumferential surface of which are formed each of the outlets 46a, 46b of the flow control valve unit 12, and a cylindrical valve member 48, rotatably disposed on the same axis within the valve seat member 46, on the circumferential surface of which each of the openings 48a, 48b are formed. The valve member 48 can be switched between an open state in which, according to its rotational angle, each of the openings 48a, 48b of the valve member 48 and the cylindrical valve seat member 46 outflow openings overlap in the radial direction of the valve member 48 and the valve seat member 46, and a closed state in which the circumferential surface of the valve member 48 closes each of the outlets 46a, 46b of the valve seat member 46. Furthermore, an inlet path 52 is formed on the flow control valve unit 12, into which a hot and cold water mixture which has passed through the hot and cold water mixing valve unit 6 flows into the valve member 48 from the longitudinal direction of the flow control valve unit 12. Also, in the open state an outlet path 54a for outflow from the openings 48a of the valve member 48 and the outlets 46a of the valve seat member 46, or an outlet path 54b for outflow from the valve member 48 shower spouting openings 48b and the shower spouting outlets 46b of the valve seat member 46, are formed on the flow control valve unit 12. In addition, the inlet path 52 of the flow control valve unit 12 and each of the outlet paths 54a, 54b are perpendicular to one another.

Thus in the open state after the hot and cold water mixture that has passed through the hot and cold water mixing valve unit 6 flows into the flow control valve unit 12 valve member 48 from the longitudinal direction of the flow control valve unit 12, it passes through the openings 48a, 48b on the valve member 48 and flows out in the radial direction of the valve member 48 and valve seat member 46 from the outlets 46a, 46b of the valve seat member 46. Outflow is also possible to the spouting discharge flow paths 26, 32 from the spout outlets 26a, 32a of the valve device main body 2 directly overlapping the outlets 46a, 46b of the flow control valve unit 12.

Also, the inlet path 52 and the outlet paths 54a, 54b in the flow control valve unit 12 are perpendicular to one another.

Thus there is no need to provide a flow path on the valve device main body 2 on the downstream side from the outlets 46a, 46b of the flow control valve unit 12 to the spout outlets 26a, 32a of the valve device main body 2, so the valve device main body 2 can be further reduced in size.

Also, using the hot and cold water mixing valve device 1 according to the present embodiment, the central axis A1 of the water spouting spout port 26b and the central axis A2 of the shower spouting outlet 32a of the valve device main body 2 pass midway between the central axis A3 of the hot water inlet 20 and the central axis A4 of the cold water inlet 22 of the valve device main body 2.

Thus the hot water inlet 20 and the cold water inlet 22 of the valve device main body 2 are respectively disposed at substantially equal distances relative to the water spouting spout port 26b and the shower spouting outlet 32a of the valve device main body 2.

Therefore design characteristics of the hot and cold water mixing valve device 1 can be improved, and users can more easily access the spout 24 and the shower hose connecting pipe 30 of the valve device main body 2, respectively, from either of the two ends in the longitudinal direction of the hot and cold water mixing valve device 1.

In addition, according to the hot and cold water mixing valve device 1 of the present embodiment, the central axis A2 of the shower spouting outlet 32a of the valve device main body 2 passes through the center O1 in the longitudinal direction of the valve device main body 2. Thus the shower hose connecting pipe 30 of the valve device main body 2 to which the shower hose 28 is connected is positioned at an equal distance from the two end portions in the longitudinal direction of the valve device main body 2.

Therefore design characteristics of the hot and cold water mixing valve device 1 can be improved, and users can more easily access the valve device main body 2 shower hose connecting pipe 30 from either of the two ends in the longitudinal direction of the hot and cold water mixing valve device 1.

Although the present invention has been explained with reference to specific, preferred embodiments, one of ordinary skill in the art will recognize that modifications and improvements can be made while remaining within the scope and spirit of the present invention. The scope of the present invention is determined solely by appended claims.

What is claimed is:

1. A hot and cold water mixing valve device for spouting and turning off a hot and cold water mixture, the mixing valve device comprising:
   a hot and cold water mixing valve unit being formed cylindrically, the hot and cold water mixing valve unit being configured to produce the hot and cold water mixture;
   a flow control valve unit being formed cylindrically, the flow control valve unit being configured to control a flow volume of the hot and cold water mixture;
   a valve device main body being formed cylindrically, the valve device main body including: a hot water inlet into which hot water supplied from a hot water supply source flows; a cold water inlet into which cold water supplied from the cold water supply source flows; an outlet from which the hot and cold water mixture is discharged; and a cylindrical portion being inside of the valve device main body and being configured to extend in a longitudinal direction of the valve device main body;
   a hot and cold water mixing valve housing having a watertight connection with one end of the cylindrical portion when the hot and cold water mixing valve housing is inserted from one end of the valve device main body; and a flow control valve housing being capable of watertight connection to other end of the cylindrical portion when the flow control valve housing is inserted from other end of the valve device main body;

wherein one end of the hot and cold water mixing valve unit is configured to be connected in a watertight manner to an inside of the hot and cold water mixing valve housing;

the flow control valve unit is configured to be connected in a watertight manner to the inside of the flow control valve housing; and wherein the hot and cold water mixing valve housing and the hot and cold water mixing valve unit are inserted from one end of the valve device main body while the flow control valve housing and flow control valve unit are inserted into the other end of the valve device main body, the inside of the valve device main body includes: a hot water passageway allowing communication between only the hot water inlet of the valve device main body and a hot water inlet of the hot and cold water mixing valve unit; and a cold water passageway allowing communication between only the cold water inlet of the valve device main body and a cold water inlet of the hot and cold water mixing valve unit;

the cold water passageway is formed between the valve device main body and the flow control valve housing, between the valve device main body and the cylindrical portion, and between the valve device main body and the hot and cold water mixing valve housing;

a downstream side of the hot and cold water mixing valve unit is configured to communicate with only the flow control valve unit via the hot and cold water mixing valve housing; and a downstream side of the flow control valve unit is configured to communicate with only the outlet on the valve device main body.

2. The mixing valve device according to claim 1, wherein the hot and cold water mixing valve housing and the flow control valve housing are substantially cylindrical; and the hot and cold water mixing valve housing includes a connecting portion configured to connect in a watertight manner with the one end of the cylindrical portion, and the flow control valve housing includes a connecting portion configured to connect in a watertight manner with the other end of the cylindrical portion;

each channel is formed over an entire perimeter on an outer circumferential surface of each connecting portion of the hot and cold water mixing valve housing and the flow control valve housing;

the hot and cold water mixing valve housing and the flow control valve housing respectively include one or more seal members disposed on the channels in the outer circumferential surfaces of the each connecting portion;

the hot and cold water mixing valve housing and the cylindrical portion of the valve device main body are sealed in a watertight manner when the seal member of the hot and cold water mixing valve housing is disposed between the one end of the cylindrical portion and the channel on the connecting portion of the hot and cold water mixing valve housing, while the hot and cold water mixing valve housing is inserted from one end of the valve device main body into the valve device main body; and the flow control valve housing and the cylindrical portion of the valve device main body are connected in a watertight manner when the seal member of the flow control valve housing is disposed between the other end of the cylindrical portion and the channel on the connecting portion of the flow control valve housing, while the flow control valve housing is inserted from the other end of the valve device main body into the valve device main body.

3. The mixing valve device according to claim 1, wherein a plurality of openings are formed on an outer circumferential surface of the hot and cold water mixing valve housing, and water flowing in from the cold water inlet of the valve device main body is capable of flowing into a cold water inlet of the hot and cold water mixing valve unit through the openings of the hot and cold water mixing valve housing.

4. The mixing valve device according to claim 3, wherein the openings are formed at equal spacing in a circumferential direction on the outer circumferential surface of the hot and cold water mixing valve housing.

5. The mixing valve device according to claim 1, further comprising a cylindrical hot and cold water mixing valve-holding housing configured to hold the hot and cold water mixing valve unit, the cylindrical hot and cold water mixing valve-holding housing being disposed at a separation outside in a longitudinal direction of the hot and cold water mixing valve housing;

wherein the hot and cold water mixing valve-holding housing is supported in the valve device main body;

one end of the hot and cold water mixing valve housing is supported on the cylindrical portion of the valve device main body, and the other end of the hot and cold water mixing valve housing is held by the hot and cold water mixing valve unit held by the hot and cold water mixing valve-holding housing; and the hot and cold water mixing valve-holding housing includes a hot water passageway port being configured to overlap both the hot water inlet of the valve device main body and the hot water inlet of the hot and cold water mixing valve unit.

6. The hot and cold water mixing valve device according to claim 1, wherein the flow control valve unit is configured to be held inside the cylindrical portion when one end of the flow control valve unit is inserted from the other end of the valve device main body through the flow control valve housing, and the flow control valve unit includes an outlet configured to allow the hot and cold water mixture to flow out when the hot and cold water mixture flows into the flow control valve unit from a side of the hot and cold water mixing valve unit, and the flow control valve housing is disposed between the other end of the valve device main body and the other end of the cylindrical portion so that the outlet of the flow control valve unit and the out let of the valve device main body directly overlap with each other.

7. The mixing valve device according to claim 6, wherein the flow control valve unit further includes: a valve seat member being cylindrical and being placed inside the cylindrical portion, the outlet of the flow control valve unit being formed on a circumferential surface of the valve seat member; and a valve member being cylindrical and being placed in the valve member so as to rotate coaxially in the valve seat member, one or more openings being formed on a circumferential surface of the valve member;
wherein the valve member is configured to be switched between either an open state or a closed state depending on a rotational angle of the valve member, the open state being where the opening of the valve member and the outlet of the cylindrical valve seat member overlap in a radial direction of the valve member and the valve seat member, the closed state being where the circumferential surface of the valve member closes the outlet of the valve seat member;
wherein the flow control valve unit further includes: an inlet path configured to allow the hot and cold water mixture which has passed through the hot and cold water mixing valve unit to flow into the valve member from a longitudinal direction of the flow control valve unit; and an outlet path where a flow is permitted in the open state from the opening of the valve member and from the outlet of the valve seat member; and
the inlet path and the outlet path of the flow control valve unit are perpendicular to each other.

8. The mixing valve device according to claim 1, wherein a central axis of the outlet on the valve device main body passes a midway position between a central axis of the hot water inlet of the valve device main body and a central axis of the cold water inlet of the valve device main body, or passes close to the midway position.

9. The mixing valve device according to claim 1, wherein the central axis of the outlet on the valve device main body passes through a center in a longitudinal direction of the valve device main body, or passes close to the center.

* * * * *